United States Patent [19]
Nakata

[11] Patent Number: 5,341,868
[45] Date of Patent: Aug. 30, 1994

[54] OPERATING DEVICE FOR AIR-CONDITIONER

[75] Inventor: Futoshi Nakata, Konan, Japan
[73] Assignee: Zexel Corporation, Japan
[21] Appl. No.: 996,109
[22] Filed: Dec. 23, 1992
[30] Foreign Application Priority Data
  Feb. 7, 1992 [JP] Japan .................. 4-056688
[51] Int. Cl.$^5$ .......................... F25B 29/00
[52] U.S. Cl. ..................... 165/11.1; 165/24;
        165/27; 165/42; 62/228.4; 62/161; 62/160
[58] Field of Search ........... 165/24, 25, 26, 27,
        165/42, 43, 11.1; 454/269; 62/228.4, 160, 161;
        236/13; 237/12.3 B

[56]  References Cited
  U.S. PATENT DOCUMENTS

| | | | |
|---|---|---|---|
| 1,445,753 | 2/1923 | Carroll | 62/228.4 |
| 2,030,945 | 2/1930 | Smith et al. | 165/25 |
| 2,130,995 | 9/1938 | Henney | 62/228.4 |
| 2,291,769 | 8/1942 | Smellie | 165/26 |
| 2,864,590 | 12/1958 | Moore | 165/24 |
| 3,490,518 | 1/1970 | Herbon | 165/42 |
| 3,499,297 | 3/1970 | Ruff et al. | 62/160 |
| 3,771,318 | 11/1973 | Roberts | 62/228.4 |
| 4,237,967 | 12/1980 | Harding et al. | 165/43 |
| 4,357,988 | 11/1982 | Hudson et al. | 62/228.4 |
| 4,407,139 | 10/1983 | Ide et al. | 62/228.4 |
| 4,560,103 | 12/1985 | Schulz et al. | 454/269 |
| 4,667,480 | 5/1987 | Bessler | 62/228.4 |
| 4,856,286 | 9/1989 | Sulfstede et al. | 62/228.4 |

FOREIGN PATENT DOCUMENTS

| | | | |
|---|---|---|---|
| 50-21710 | 7/1975 | Japan . | |
| 0079016 | 6/1981 | Japan | 165/27 |
| 0000908 | 1/1982 | Japan | 165/24 |
| 0074204 | 5/1982 | Japan | 165/25 |
| 0174012 | 10/1983 | Japan | 236/13 |
| 61-10120 | 6/1986 | Japan . | |
| 0041917 | 2/1990 | Japan | 237/123 B |

Primary Examiner—John K. Ford
Attorney, Agent, or Firm—Bacon & Thomas

[57] ABSTRACT

A heat-pump type air-conditioner includes a potentiometer provided to output a voltage corresponding to a position of a slidable terminal movable on a register element. Based on the magnitude of the output voltage, one of a cooling mode, a stop mode and a heating mode is set, as is the speed of the compressor consequently, both the modes selection and the temperature control can be performed with one switch operation.

8 Claims, 7 Drawing Sheets

OPERATING DEVICE FOR AIR-CONDITIONER

BACKGROUND OF THE INVENTION

1. Field of the Invention

The present invention relates to a control device for an air-conditioner, and in particular to a control device for an automotive heat-pump type air conditioner which can be shifted between heating and cooling modes through a valve, for example an electromagnetic valve, a three-way valve, a four-way valve or a check valve.

2. Description of Related Art

A typical heat-pump type air-conditioner or climate control system is described hereinafter. The heat-pump type air-conditioner generally includes a first heat-exchanger disposed within an air-conditioning duct, a second heat-exchanger disposed outside the air-conditioning duct, refrigerant expanding means such as an orifice or an expansion valve which are disposed between the two heat exchangers, a four-way valve for changing a flow direction of refrigerant in the two heat-exchangers, a compressor for compressing the refrigerant, and a receiver tank. The air-conditioner thus constructed is switched from a cooling mode into a heating mode or vice versa by shifting the four-way valve to change the flow direction of the refrigerant flowing in the first and second heat exchangers. Such a heat-pump type air-conditioner has an advantage in that both the heating and cooling modes can be accomplished by using one heat-exchanger, the heat exchanger functioning as a condenser for heating the air passing therethrough in the heating mode and as an evaporator for cooling the air passing therethrough in the cooling mode.

However, it is impossible in this type of air-conditioner, and also in other conventional air-conditioners such as those which use a three-way valve and/or an electromagnetic valve with no reversal of the refrigerant flow, as described in Japanese U.M. publication Nos. 50-21710 and 61-101020, to consecutively shift the heating mode into the cooling mode and vice versa while varying the temperature in a linear manner, and thus such air-conditioners must have two separate switches, i.e. a shift switch for shifting the air-conditioner between the heating mode and the cooling mode and a temperature adjustment switch for controlling the heating or cooling capacity of the heat exchanger, that is, for increasing and decreasing a rotational number or speed of the compressor.

Therefore, a driver or passenger must operate two switches in order to implement a particular temperature control request, which increases the difficulty of operating the air-conditioner, impeding safe operation of the vehicle.

SUMMARY OF THE INVENTION

It is an object of the present invention to provide a control device for a heat-pump type air-conditioner or climate control system, by which both the shift operation between the cooling mode and the heating mode and the temperature control can be accomplished using a single switch in a simple manner.

In order to attain the above-noted object and other objects, a preferred embodiment of the present invention provides an air-conditioner or climate control system which includes a heat exchanger system utilizing a refrigerant and a compressor for forcing and circulating the refrigerant, and means for selectively shifting the heat exchange system into one of a cooling mode, a stop mode and a heating mode. The shifting means includes a resistor element to which a predetermined voltage is applied at both ends, a terminal movable on and along the resistor element for outputting a voltage corresponding to its position on the resistor element, and control means for setting one of the cooling, stop and heating modes for the heat exchange system and for setting a revolution number or speed of the compressor in each of the cooling and heating modes, based on the voltage output from the terminal.

In accordance with the present invention, both the selection among the cooling mode, the stop mode and the heating mode, and the temperature control can be accomplished by changing the revolution number or speed of the compressor based on the position of the single terminal relative to the resistor element. Accordingly, operation of the air-conditioner is simplified.

DETAILED DESCRIPTION OF THE PREFERRED EMBODIMENTS

A preferred embodiment of the present invention will now be described in detail with reference to the accompanying drawings attached hereto.

Figure 1:
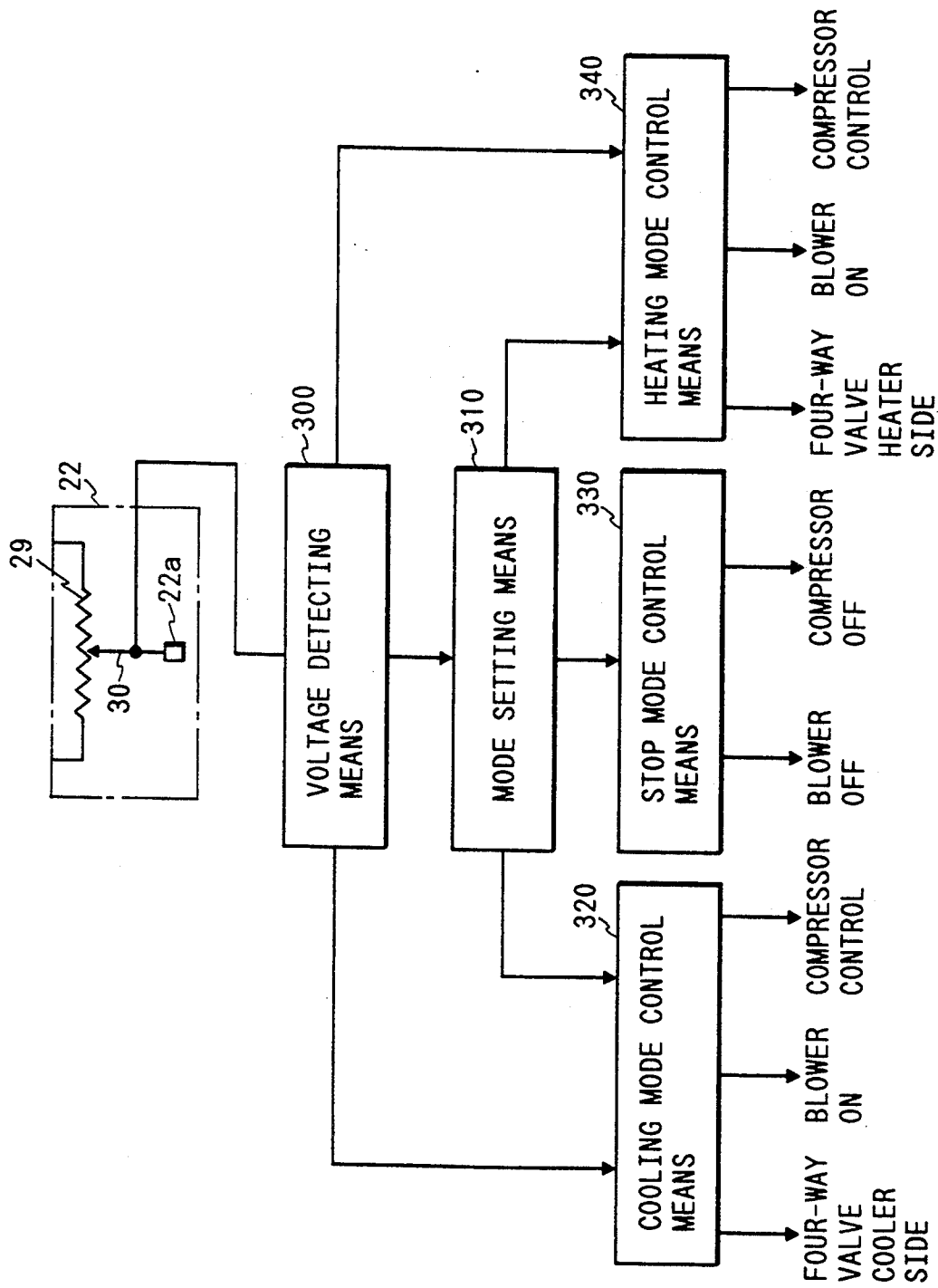
FIG. 1 is a block diagram showing a control device for an air conditioner according to a preferred embodiment of the present invention.

FIG. 1 shows a control device according to an embodiment of the present invention. The control device is made up of a sliding switch 22 including a resistor element 29 to which voltage is applied at both ends, a slidable terminal 30 which is slidable on and along the resistor element 29 and which outputs a voltage corresponding to a position of the slidable terminal 30 on the resistor element 29, and a knob 22a mounted on the slidable terminal 30 for slidingly driving or moving the slidable terminal 30. The control device further comprises a voltage detecting means 300 for detecting the voltage output from the slidable terminal 30, and a mode setting means 310 for setting for an air-conditioner a cooling mode when the voltage detected by voltage detecting means 300 is less than a first predetermined value, a stop mode when the detected voltage is greater than the first predetermined value but less than a second predetermined value, and a heating mode when the detected voltage is greater than the second predetermined value.

The control device further includes a cooling mode control means 320 for driving and controlling respective component parts of the air-conditioner when the cooling mode is set so that the air conditioner functions as a cooler, a stop mode control means 330 for stopping respective component parts when the stop mode is set, and a heating mode controlling means for driving and controlling respective component parts when the heating mode is set so that the air-conditioner functions as a heater.

More specifically, in the embodiment shown in FIG. 1, when the cooling mode is set, the cooling mode control means 320 shifts a four-way valve into a cooling mode side, drives a blower, and drives a compressor in such a manner that as the voltage detected by the voltage detection means 300 is lowered from the first predetermined value, the number of revolutions or speed of the compressor is increased. When the stop mode is set, the stop mode control means 330 stops the blower and the compressor. When the heating mode is set, the heating mode control means 340 shifts the four-way valve into a heating mode side, drives the blower, and drives the compressor so that, when the voltage detected by the voltage detection means 300 is greater than the second predetermined value, the number of revolutions or speed of the compressor is increased.

Figure 2:
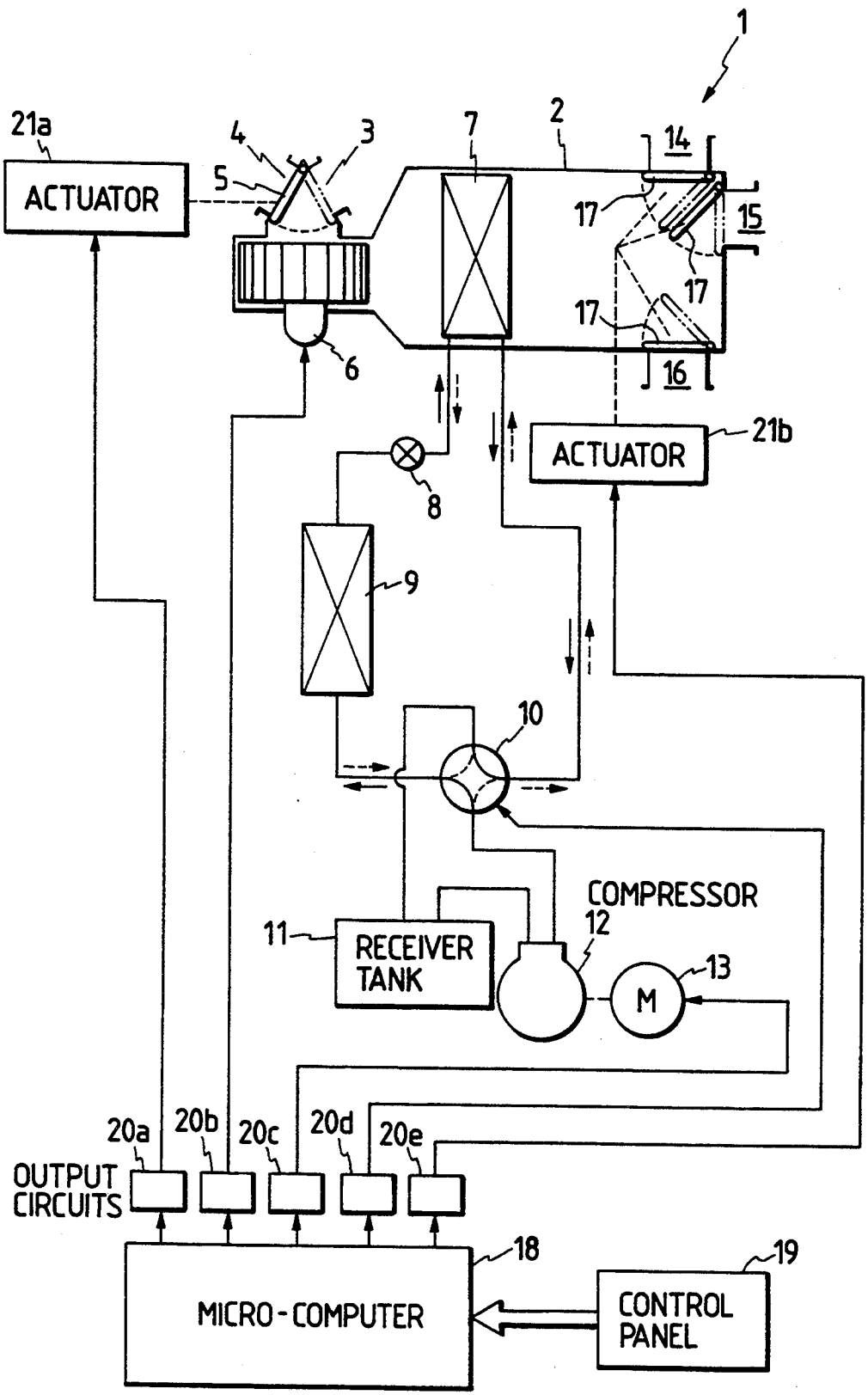
FIG. 2 is a schematic view showing a construction of one example of a heat-pump type air conditioner, to which the present invention is applicable.

FIG. 2 shows a heat-pump type air-conditioner to which the control device of the present invention is applied in accordance with the preferred embodiment of the invention. It will be appreciated by those skilled in the art, however, that the control device of FIG. 1 may be applied as well to air-conditioners other than the specific one shown in detail in FIG. 2.

The heat-pump type air-conditioner 1 shown in FIG. 2 is used, for example, in an automotive vehicle. The conditioner comprises an air-conditioning duct 2 with an internal air introducing inlet 3 and an external air introducing inlet 4 which are opened at an upstream side of the air-conditioning duct 2, and an internal/external air shift door 5 for selectively opening and closing the internal air introducing inlet 3 and the external air introducing inlet 4.

A blower 6 is provided within the air-conditioning duct downstream from the internal and external air introducing inlets 3 and 4. A first heat-exchanger 7 is provided within the air-conditioning duct 2 downstream from the blower 6. The first heat-exchanger 7 constitutes a heat exchange system for providing a heat exchange cycle in cooperation with an expansion valve 8, a second heat-exchanger 9 disposed outside the air-conditioning duct 2, a four-way valve 10, a receiver tank 11 and a compressor 12 driven by a motor 13. The first heat-exchanger 7 selectively functions as a condenser for heating the air passing therethrough and an evaporator for cooling the air passing therethrough depending on the shift operation of the four-way valve 10.

The air-conditioning duct 2 is provided at the most downstream side thereof with a defrost air-blowing outlet 14, a ventilation air-blowing outlet 15 and a heat air-blowing outlet 16, outlets 14–16 being selectively opened and closed by mode doors 17.

In the heat exchange cycle, when the four-way valve 10 is shifted into a cooling mode side as shown by a solid line in FIG. 2, a gaseous refrigerant with high-temperature and high-pressure, which has been compressed by the compressor 12, is transmitted in the direction shown by a slide arrow through the four-way valve 10 into the second heat exchanger 9. The second heat exchanger 9 functions in this case as a condenser so that the high-temperature and high-pressure gaseous refrigerant passing inside thereof is liquified as it radiates or releases its heat to the air passing through the heat exchanger 9. Therefore, the high-temperature and high-pressure gaseous refrigerant is converted by the second heat-exchanger 9 into high-pressure liquid refrigerant.

Thereafter, the high-pressure liquid refrigerant is atomized through the expansion valve 8 so as to be converted into an atomized low-pressure refrigerant and is transmitted to the first heat-exchanger 7. The first heat-exchanger 7 functions in this case as an evaporator, and the atomized refrigerant passing inside the first heat-exchanger 7 absorbs heat from the air passing therethrough, is converted into low-pressure gaseous refrigerant in the heat exchanger 7, and is returned through the four-way valve 10 and the receiver tank 11 to the compressor 12. With these steps, the heat exchange cycle is driven as a cooling cycle so that the air which passes through the first heat-exchanger 7 is cooled.

On the other hand, when the four-way valve 10 is shifted into a heating mode side as shown by a broken line in FIG. 2, the gaseous refrigerant which has been compressed by the compressor 12 is transmitted into the first heat-exchanger 7 in a direction indicated by the broken arrow in FIG. 2, i.e. in a direction opposite to the direction in the cooling mode. The heat-exchanger 7 functions in this case as a condenser so that the gaseous refrigerant generates or releases its heat to the air passing through the first heat-exchanger 7, with the result that the gaseous refrigerant is liquified while heating the air. In this heating mode, the second heat-exchanger 9 functions as an evaporator, contrary to its function in the cooling mode, and the heat exchange cycle is driven as a heating cycle.

With this arrangement, the internal air or external air selected by the internal/external air shift door 5 is suctionally introduced into the air-conditioning duct 2 by driving the blower 6, is made to pass through the first heat-exchanger 7 so as to be heated or cooled, and then is blown out from the air-blowing outlets 14, 15 and 16 selected by the mode doors 17 to the interior of the automobile, thereby controlling the temperature in the automobile.

In order to control the heat-pump type air-conditioner 1 thus constructed, a micro-computer 18 is provided which receives signals transmitted from an operation panel 19 (described later), processes the signals through a predetermined program, and outputs the control signals thus obtained to respective output circuits 20a–20e, to thereby control respective control equipment or component parts of the system. More specifically, the micro-computer 18 controls, through the output circuit 20a, an actuator 21a which drives internal/external air shift door 5; through the output circuit 20b, the blower 6; through the output circuit 20c, the motor 13; through the output circuit 20d, the four-way valve 10; and through the output circuit 20e, an actuator 21b which drives the mode doors 17.

Figure 3:
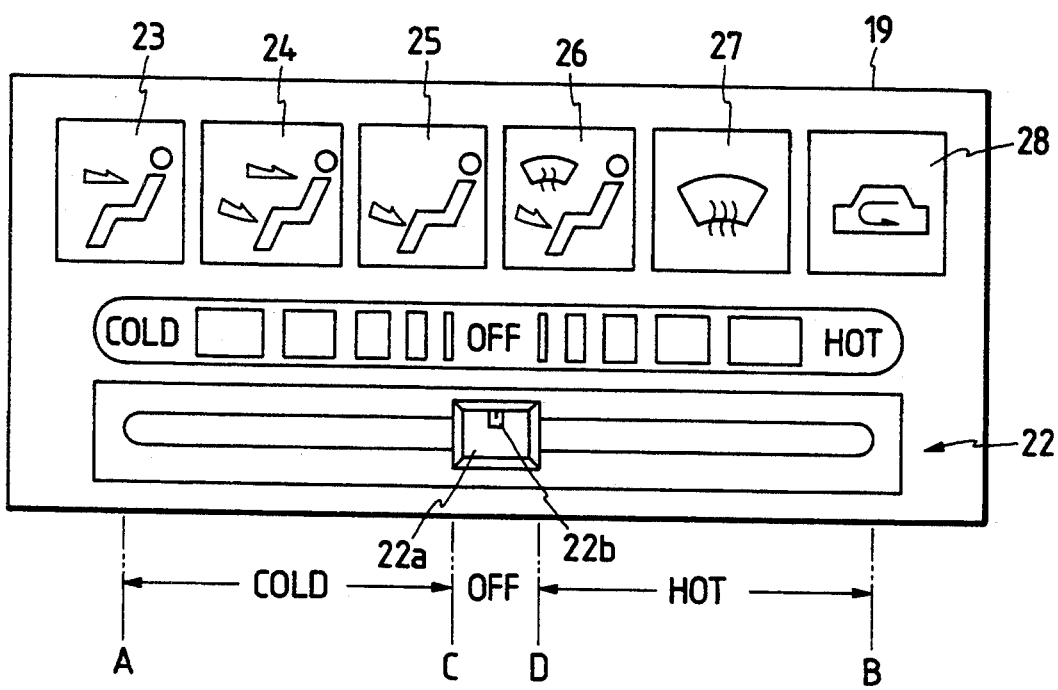
FIG. 3 is a schematic view showing a construction of one example of an operation panel, to which the control device of the present invention is mounted.

FIG. 3 shows in detail an example of control panel 19 according to the present invention, including the slide switch 22 for turning the air-conditioner on and off, shifting the air-conditioner between cooling and heating modes, and controlling the temperature condition, a switch 23 for setting a ventilation blower mode in which the temperature-controlled air blows out from the ventilation outlet 15, a switch 24 for setting a bi-level mode where the temperature-controlled air blows out from both the ventilation outlet 15 and the heater air outlet 16, a switch 25 for setting a heat mode where the temperature-controlled air blows out from the heater air outlet 16, a switch 26 for setting a defrost-heat mode where the temperature-controlled air blows out from both the defrost air-blowing outlet 14 and the heater air outlet 16, a switch 27 for setting a defrost mode where the temperature-controlled air blows out from the defrost air-blowing outlet 14, and a shift switch 28 for manually shifting the internal/external air shift door 5 into an internal air circulation mode.

In the slide switch 22, an off mode zone, a cold mode zone and a hot mode zone are defined at a substantially central portion, a left-hand side portion and a right-hand side portion thereof, respectively, as shown in FIG. 3, the off mode zone being interposed between the cold mode zone and the hot mode zone. Depending on the position of the knob 22a, which position is indicated by an indicator portion 22b provided on the knob 22 at a central portion thereof, the selection is made among the cooling mode, the off mode and the heating mode, and the determination is also made with respect to the number of revolutions or speed of the compressor.

Figure 4:
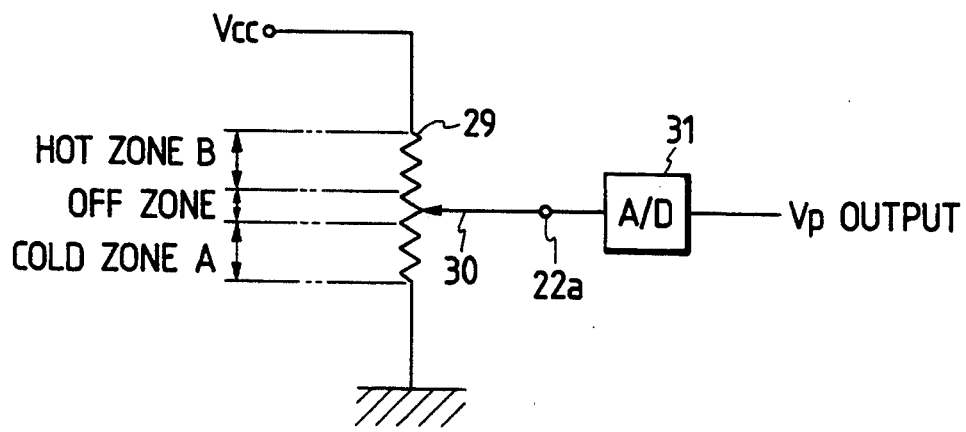
FIG. 4 is a diagram showing an electric circuit for a slide switch of the preferred control device.
Figure 5:
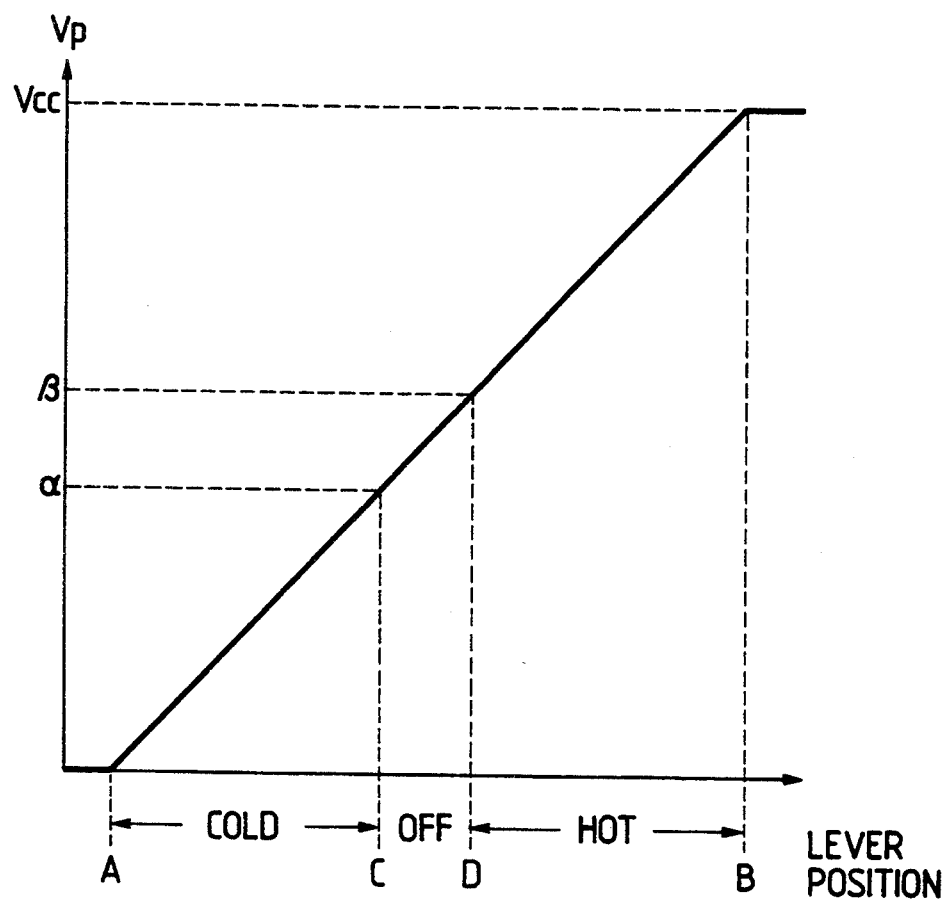
FIG. 5 is a graph of the relationship between a lever position and an output voltage for the preferred control device.

As shown in FIG. 4, the slide switch 22 includes the resistor element 29 to which a predetermined voltage $V_{cc}$, for instance 5 V, is applied at ends, and the terminal 30 which slides on the resistor element 29 in conjunction with the motion of the knob 22. The slide switch 22 can output voltages $0 V - V_{cc}V$ in proportion to a position of the knob 22a when the terminal 30 slides on the resistor element 29 from one end A to the other end B as shown in FIG. 5. In addition, referring to FIGS. 3 and 5, the detected voltage when the indicator portion 22b of the knob 22a indicates the A position is 0V; at the C position, the voltage is $\alpha V$ (for instance, 2 V); at the D position, the voltage is $\beta V$ (for instance, 3 V); and at the B position, the voltage is $V_{cc}V$ (for instance, 5 V).

Figure 6:
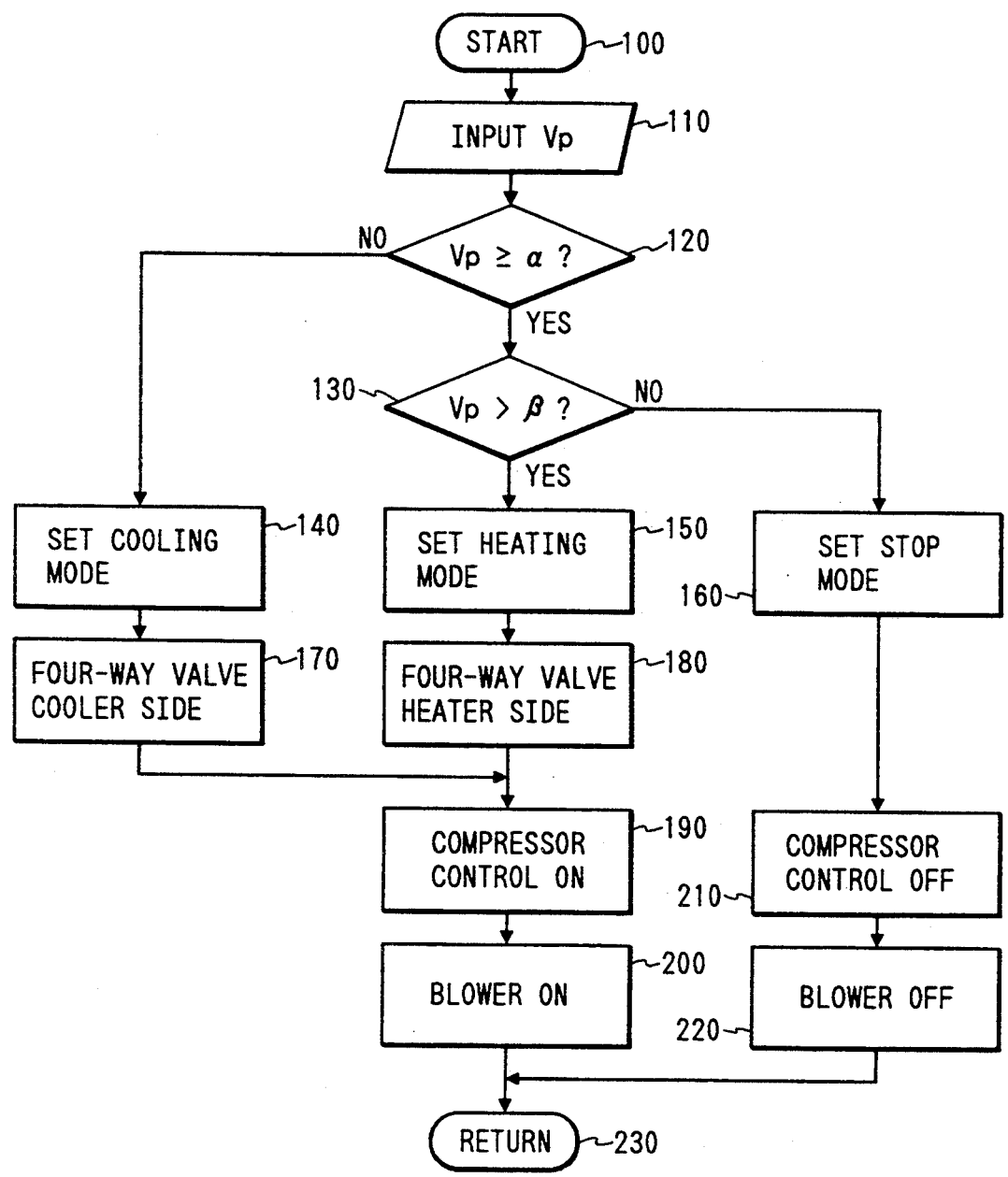
FIG. 6 is a flow-chart showing a control process for an air-conditioner according to the present invention, which is executed by a micro-computer.

The output voltage is converted by an A/D converter 31 into a digital signal $V_p$ corresponding to and indicative of the output voltage and which is output to the micro-computer 18. The micro-computer 18 includes a central processing unit (CPU), a random access memory (RAM), a read only memory (ROM) and an input/output port (I/O) as is well-known. The micro-computer reads the input signal $V_p$ and subjects the signal $V_p$ to processing in accordance with a predetermined program. The program is described with reference to the flow-chart shown in FIG. 6.

The flow-chart is initiated at step 100, for example, by periodically receiving an interrupt instruction from a timer, or a jump instruction, or the like from a main control routine (not shown) for controlling the entire air-conditioner. In step 110, the signal $V_p$ input from the slide switch 22 through the A/D converter 31 is read.

In step 120, judgement is made as to whether or not the signal $V_p$ is not less than a first predetermined value $\alpha$ (i.e. the voltage value $\alpha$ at the C point). When it is judged in step 120 that the signal $V_p$ is less than the first predetermined value $\alpha$ (i.e., when the judgement is "NO"), the flow-chart proceeds to step 140 in which the cooling mode (COLD) is set for the air-conditioner, and then to step 170 in which the four-way valve is shifted into the cooling mode side to execute the cooling drive. On the other hand; if it is judged in step 120 that the signal $V_p$ is equal to or more than the first predetermined value $\alpha$ (i.e., when the judgement is "Yes"), then the flow-chart proceeds to step 130 in which judgement is made as to whether or not the signal $V_p$ is more than a second predetermined value $\beta$ (i.e. the voltage value $\beta$ at the D point).

If it is judged in step 130 that the voltage value $V_p$ is more than the second predetermined value $\beta$ (the judgement is "Yes"), the flow-chart proceeds to step 150 where the heating mode (HOT) is set for the air-conditioner, and then to step 180 where the four-way value 10 is shifted into the heating mode side to execute the heating drive.

If it is judged in step 130 that the signal $V_p$ is not more than the second value $\beta$ (the judgement is "NO"), the flow-chart proceeds to step 160 where the stop mode (OFF) is set for the air-conditioner, and then to step 210 where the compressor control is stopped (OFF). In step 220 the blower drive is stopped (OFF). Thereafter, the flow-chart returns through step 230 to the main control routine.

As described above, owing to the judgements in steps 120 and 130, the cooling mode is selected when the indicator portion 22b is positioned within an area defined between the points A and B ($V_p < \alpha$), the stop mode is selected when it is positioned within an area defined between the points C and D ($\alpha \leq V_p \leq \beta$), and the heating mode is selected when it is positioned within an area defined between the points D and B ($\beta < V_p$).

After the four-way valve 10 is shifted into the cooling mode side in step 170, or into the heating side in step 180, the flow-chart proceeds to step 190 at which time the control for the compressor is started.

Figure 7:
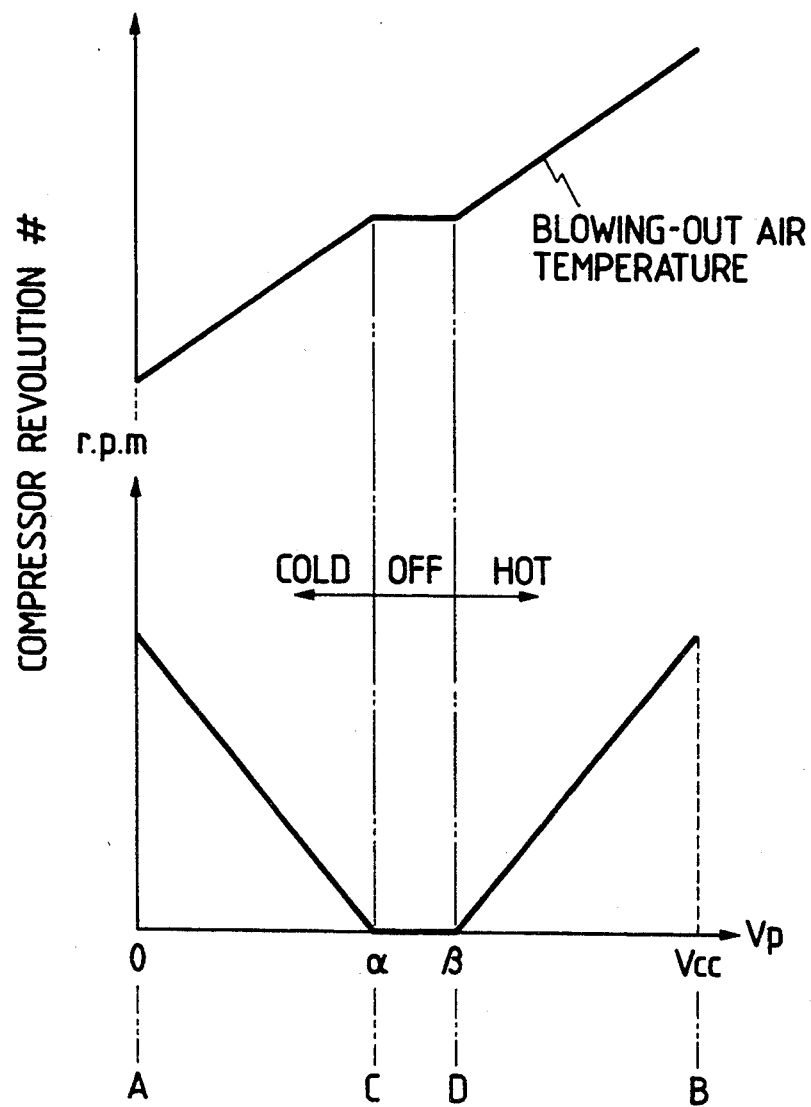
FIG. 7 is a diagram showing a control for a compressor in accordance with the present invention, particularly showing a relationship between a compressor revolution number or speed and an output voltage, depending on a lever position, and the temperature of the air blown out by the compressor.

FIG. 7 illustrates the operation of the compressor, which is started in step 190. As shown in FIG. 7, the number of revolutions or speed of the compressor is set such that as the signal $V_p$ is decreased from the first predetermined value $\alpha$ toward zero, the number of revolutions or speed of the compressor is increased from zero at the point C toward the maximum value at the point A for the cooling mode, and as the signal $V_p$ is increased from the second predetermined value $\beta$ toward the value Vcc, the number of revolutions or speed of the compressor is increased from zero at the point D toward the maximum value at the point B for the heating mode. According to this compressor control, it is possible to obtain the blowing-out air temperature curve shown in FIG. 7.

After the compressor control is started in step 190, the blower 6 is driven or turned ON in step 200, and thereafter, the flow-chart returns to the main control routine through step 230.

With the above-noted arrangement, it is possible to control and operate the air-conditioner by merely moving the knob 22a of the slide switch 22. More specifically, by moving the knob 22a from the stop mode (OFF) zone defined between the points C and D to the cooling mode (COLD) zone defined between the points A and C, the heat-exchange cycle is driven as the cooling cycle and the cooling ability thereof is increased corresponding to the degree of leftward movement of the knob 22a. Similarly, by moving the knob 22a from the stop mode zone between the points C and D to the heating mode (HOT) zone between the points D and B, the heat exchange cycle is driven as the heating cycle, and the heating ability thereof is increased corresponding to the degree of rightward movement of the knob 22a.

Figure 8:
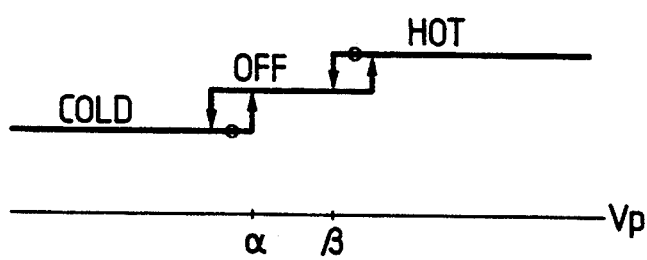
FIG. 8 is a diagram showing the mode shifting hysteresis for the preferred control device.
Figure 9:
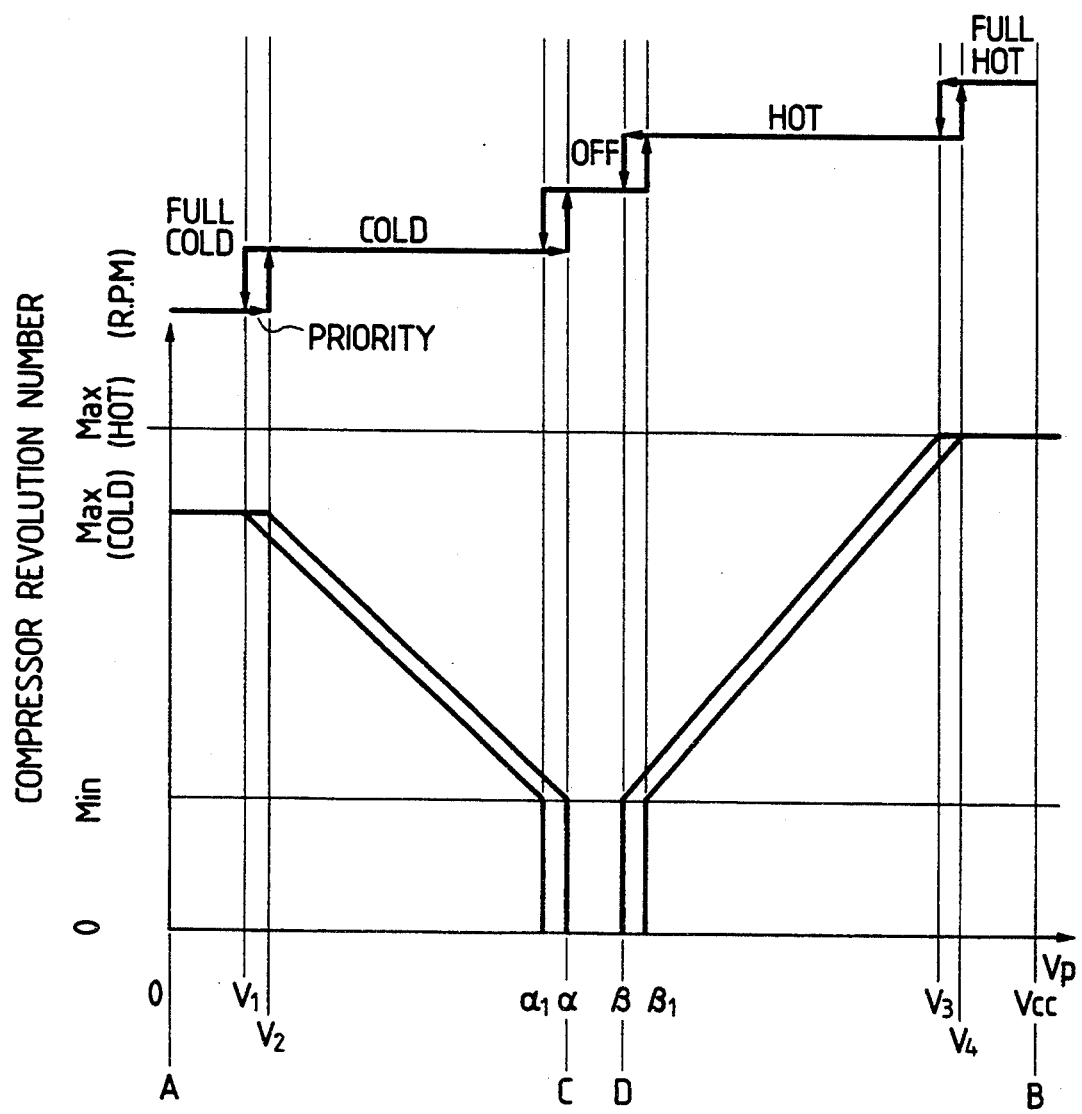
FIG. 9 is a diagram showing another control for a compressor with hysteresis formation in accordance with the present invention.

In addition, in order to smoothly perform the shift operation from one of the cool, stop and heat modes to another, a hysteresis or delay function with a predetermined range may be provided in the vicinity of the first predetermined value $\alpha$ and the second predetermined value $\beta$ as shown in FIG. 8, and described in detail below with reference to FIG. 9, which illustrates another example of a preferred control for the compressor. As shown in FIG. 9, in accordance with the magnitude of the detected voltage Vp, a full cooling mode (FULL COLD), a cooling mode (COLD), a stop mode (OFF), a heating mode (HOT), and a full heating mode (FULL HOT) are set for the control of the compressor 12. In the full cooling mode, the compressor 12 is rotated at a constant revolution number (COLD MAX) regardless of the value of the detected voltage Vp. Similarly, the compressor 12 is rotated at a constant revolution number (HOT MAX) regardless of the value of the detected voltage Vp in the full heating mode. In this control, the full cooling mode is set from the cooling mode when the knob 22a is moved so that the detected voltage Vp becomes equal to or lower than the value $V_1$.

Once the full cooling mode is set as noted above, the compressor is not shifted therefrom into the cooling mode until the detected voltage becomes greater than the voltage $V_2$. Accordingly, even if the full cooling mode is set but the knob 22a is undesirably moved to a position where the detected voltage Vp is greater than the value $V_1$ but lower than the value $V_2$, the compressor is stably maintained at a constant maximum rotation number, preventing the compressor operation from being unintentionally affected by, for example, the vibration of the automotive vehicle or the like. This is the advantage of adding a hysteresis function to the compressor control.

Similarly, in order to shift the compressor from the cooling mode into the stop mode, the knob 22a is moved so that the detected voltage Vp becomes equal to or greater than the value $\alpha$. Once the stop mode is set from the cooling mode in the above-noted manner, the compressor is not returned to the cooling mode until the detected voltage Vp becomes lower than the value $\alpha_1$. Accordingly, the compressor is securely maintained at the stop mode so as to be prevented from being repeatedly shifted between the cooling mode and the stop mode.

In a case where the heat-pump type air-conditioner described above is directly shifted from one of the heating mode and the cooling modes to the other, the control should be performed such that the heat-exchange cycle is temporarily stopped for a predetermined time period to stabilize the refrigerant in the heat exchange cycle because the high-pressure refrigerant must flow reversely. In order to cope with the above-noted case where the air-conditioner is directly shifted from one of the heating and cooling modes to the other, the control process may be arranged such that the heat-exchange cycle is maintained at the preceding mode for a first predetermined time period, then stopped for a second predetermined time period, and thereafter shifted into the succeeding mode, for protecting the compressor. In this case, the process may further be arranged such that if the operation or control knob is moved during the first predetermined time period so that the heat-exchange cycle is returned to the original mode, i.e. the preceding mode, after which both the stop of the heat-exchange cycle for the second time period and the shift of the heat-exchange cycle into the succeeding cycle are omitted to maintain the heat-exchange cycle at the original mode. This control process can cope with a case where the operation knob is accidentally moved by an object or a person's arm, and is then moved back to the original position.

It will be appreciated by those skilled in the art that although the control device of teh present invention is described in connection with a sliding type switch, the present invention should not be restricted thereto or thereby. For example, the resistor element may be formed in a fan shape and a terminal may be fixed to a rotating type knob so as to rotationally slide along the fan-shape resistor element to detect voltage corresponding to the angular position of the terminal on the register element.

Further, in the embodiment described above, the control device controls the four-way valve to reverse the flow direction of the refrigerant in the heat-exchange system to selectively use the main heat-exchanger as either an evaporator and a condenser. Again, the present invention should not be restricted thereto or thereby. The control device of the present invention can be used to control various kinds of air conditioners, for example air conditioners with main and sub heat exchange circuits which are shifted through a three-way valve and/or an electromagnetic valve without the reverse flow of the refrigerant, as disclosed in the Japanese Utility Model Examined Publication No. Sho. 50-21710 and Japanese Utility Unexamined Publication No. Sho. 61-101020.

As described above, according to the present invention, both the selection among the cooling mode, the stop mode and the heating mode, and the temperature control by the control of the compressor revolution can be made to depend simply on the position of a single switch. Therefore, the air-conditioner can be operated in a simple manner, reducing the driver's or passenger's labor, and thereby contributing to the safe operation of the automotive vehicle.

What is claimed is:

1. A control device for a climate control system which includes a heat exchange system including a heat exchanger, comprising:

shifting means including one terminal for selectively shifting the heat exchanger into one of a cooling mode, a stop mode and a heating mode, while also controlling a temperature of air output by the system within said modes, based on a position of said one terminal, wherein said heat exchange system includes means for cooling air passing therethrough when said heat exchanger is shifted into said cooling mode and for heating the air passage therethrough when said heat exchanger is shifted into said heating mode, and wherein said terminal further comprises a resistor element to which a predetermined voltage is applied at both ends thereof, and means for mounting said terminal to be movable on and along the resistor element for outputting a voltage corresponding to its position on the resistor element, and wherein said control device further comprises control means for setting a revolution number of a compressor in each of the cooling and heating modes, based on the voltage output from the terminal.

2. A control device as claimed in claim 1, further comprising means for stopping said compressor when said stop mode is set, and for rotating said compressor at said revolution number when one of said cooling and heating modes is set.

3. A control device as claimed in claim 1, wherein said heat exchange system further includes first and second heat-exchangers and means including a four-way valve for switching a flow direction of the refrigerant, and wherein said refrigerant flows in a first direction in said first and second heat-exchangers through said four-way valve so that said first heat-exchanger functions as an evaporator once said cooling mode is set, and said refrigerant flows in a second direction opposite to said first direction in said first and second heat-exchangers through said four-way valve so that said first heat-exchanger functions as a condenser when said heating mode is set.

4. A control device as claimed in claim 1, further comprising:

indication means for indicating the mode set for heat exchange system corresponding to the position of said terminal relative to said resistor element.

5. A control device as claimed in claim 2, wherein said cooling mode is set by said control means when said voltage output from said terminal is less than a first predetermined value, said stop mode is set when said voltage is not less than the first predetermined value and not greater than a second predetermined value, and said heating mode is set when said voltage is greater than said second predetermined value.

6. The control device as claimed in claim 5, wherein in said cooling mode, said revolution number of said compressor is increased as said voltage is lowered from said first predetermined value.

7. A control device as claimed in claim 5, wherein in said heating mode, said revolution number of said compressor is increased as said voltage is progressively made than said second predetermined value.

8. A control device as claimed in claim 1, further comprising means for allowing the terminal to be manually moved for selectively shifting the heat exchanger into said one of a cooling mode, a stop mode, and a heating mode, based on a position of said terminal.

* * * * *